United States Patent [19]

Sionneau

[11] Patent Number: 4,903,466
[45] Date of Patent: Feb. 27, 1990

[54] FEEDING MECHANISM FOR A MACHINE OF THE REAPER-THRESHER-TYPE

[76] Inventor: Patrick Sionneau, rue Saint-Martin, Villeromain, 41100 Vendome, France

[21] Appl. No.: 257,153

[22] Filed: Aug. 27, 1988

Related U.S. Application Data

[63] Continuation of Ser. No. 81,768, Aug. 5, 1987, abandoned.

[30] Foreign Application Priority Data

Aug. 6, 1986 [FR] France ................................. 86 11650

[51] Int. Cl.$^4$ ........................................... A01D 34/04
[52] U.S. Cl. ...................................... 56/14.6; 56/314
[58] Field of Search ...................... 56/14.5, 14.6, 314, 56/317, 318, 320, 119

[56] References Cited

U.S. PATENT DOCUMENTS

| 885,157 | 4/1908 | Hovland | 56/14.5 |
|---|---|---|---|
| 2,892,298 | 6/1959 | Chaney | 56/314 |
| 3,139,718 | 7/1964 | Rickerd et al. | 56/119 |
| 3,193,995 | 7/1965 | Miller | 56/12.9 |
| 3,503,190 | 3/1970 | van der Lely | 56/14.6 |
| 3,681,901 | 8/1972 | Buchele et al. | 56/14.5 |
| 4,195,467 | 4/1980 | Lawrence et al. | 56/314 |

FOREIGN PATENT DOCUMENTS

| 1301203 | 12/1962 | France | 56/314 |
|---|---|---|---|
| 3125659 | 1/1983 | German Democratic Rep. | 56/14.6 |
| 118125 | 2/1947 | Sweden | 56/314 |

Primary Examiner—John Weiss
Attorney, Agent, or Firm—Sughrue, Mion, Zinn, Macpeak & Seas

[57] ABSTRACT

A gear mechanism for agricultural machines capable of being moved along a direction of propagation and of cutting plants whose growth is generally vertical, has a cutter for cutting along a line making a given angle with the direction of propagation, a screw for collecting the cut stems and moving them into a flux at a given angle with the direction of propagation, and bringing them to an opening for treatment. The gear mechanism causes lateral displacement of an assembly of stems located in front of the opening and inclining the displaced stems along a direction substantially in the direction of the movement of the flux so as to send them onto the flux prior to its entry into the opening. A guide guides the flux completed by the assembly of displaced, oriented and cut stems towards the opening. The mechanism has use, in particular, for cutting cereals and forage crops intended to be treated, for example, by threshing, ensilage, etc.

2 Claims, 4 Drawing Sheets

FEEDING MECHANISM FOR A MACHINE OF THE REAPER-THRESHER-TYPE

This is a Continuation, of application Ser. No. 07/081,768 filed Aug. 5, 1987 abandoned 12/16/88.

FIELD OF THE INVENTION

The present invention relates to gear mechanisms for machines of the reaper-thresher type which are currently used in the agricultural field during harvesting of wheat, barley or any other plant essentially comprising a vertical stem with, possibly, at the top, a more or less voluminous part, for example in the form of an ear.

BACKGROUND OF THE INVENTION

Traditionally, the reaper-threshers had cutting means composed of a saw blade placed in the cutting fingers, in order to ensure the cutting of the cereals, then a large diameter feeder screw with two reversed steps so as to guide the cut plants to the right and to the left towards the entry to a conveyer which supplies a thresher. The disadvantage of this system is that the part of the harvest which is cut in the axis of the entry to the conveyer arrives directly in the free space between the two spirals of the feeder screw. In addition, this part of the harvest is composed of an assembly of relatively tall and sometimes bearded plants. They cannot therefore enter easily and in particular in a smoothly into the entry to the conveyer, due also to the arrival of laterally-cut plants which are brought by the two feeder screws. The passage of the plants is rendered very difficult and this passage is even sometimes blocked. The denser the harvest, the more this phenomenon is accentuated. A choking, called a 'bouquet' then occurs which prevents all operation of the machine without intervention by its operator.

A relatively permanent choking therefore forces the operator to drive his machine at very low speeds, especially, presently, due to the high yields which are being obtained in agriculture, in order to prevent the machine from advancing jerkily with the risk of breaking parts of components, belts, chains, variator, etc.

To overcome this disadvantage in part, manufacturers have been forced to give much more power to the motors of such machines which therefore consume much more fuel.

It also happens that, when said choking occurs, the machine can no longer cut the crops and the plants to be cut lay down and pass under the machine, which causes a loss for the grower.

SUMMARY OF THE INVENTION

The object of the present invention is to manufacture a feeding mechanism for cutting plants for reaper-thresher machines which has the simplest production, is easy to couple to said machines, which eliminates the disadvantages mentioned above by overcoming the choking at the conveyer entry, and which enables said machines to move at a higher, more regular speed, in order to contribute to an increase in the cutting yield and in the life of said machines as compared to those of machines not comprising a feeding mechanism in accordance with the invention.

More specifically, the object of the present invention is a feeding mechanism for a machine such as a reaper or possibly a thresher, which is capable of moving along a direction of propagation and of cutting plants whose stems have substantially vertical growth, with said machine comprising means for cutting said stems along a line making a non-negative angle with said direction of propagation, means for collecting the cut stems, moving them in a flux making a non-negative angle with said direction of propagation and bringing them to an opening for treatment, wherein said feeding mechanism comprises:

means for laterally displacing an assembly of stems located in front of said opening, means for inclining the displaced stems of said assembly along a direction substantially in the direction of movement of said flux and in order to send them onto said flux before its entry into said opening, and means for guiding said flux completed by said assembly of stems towards said opening.

BRIEF DESCRIPTION OF THE DRAWINGS

Other characteristics and advantages of the present invention will become apparent from the present description which is given in relation to the attached illustrative drawings which are in no way limiting, wherein.

DESCRIPTION OF THE PREFERRED EMBODIMENT

It should first be pointed out that, in the present description, the same references designate the same components regardless of the drawings on which they appear.

Figure 1:
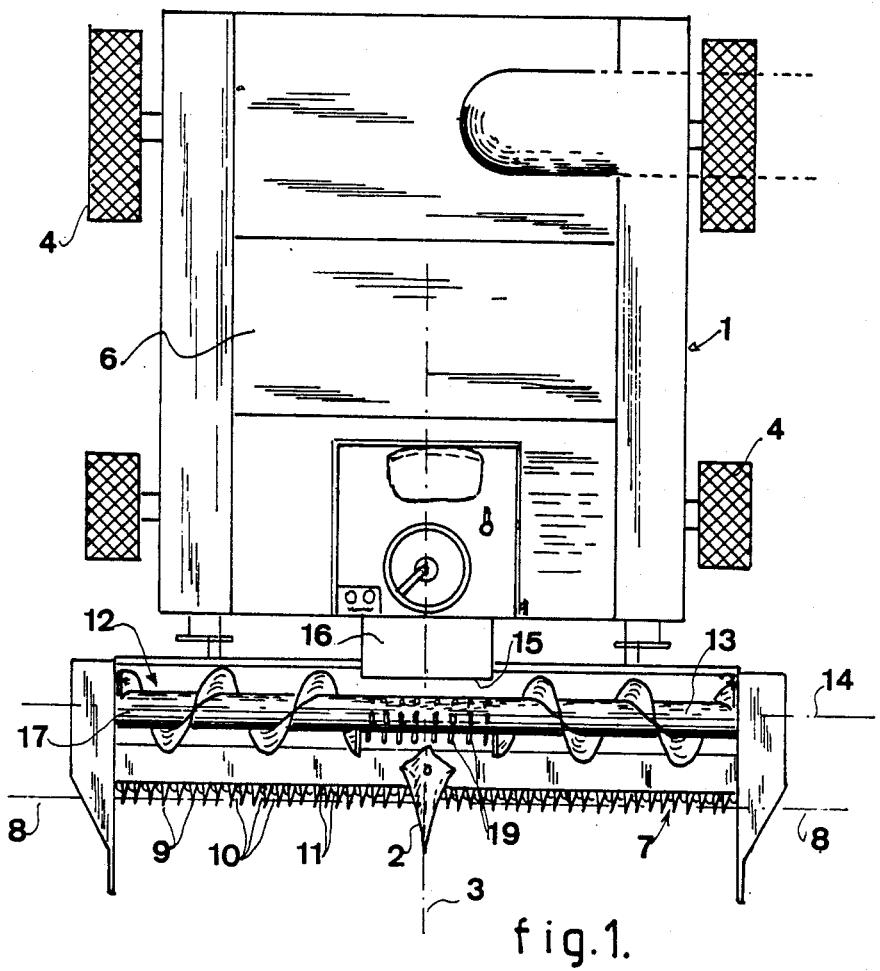
FIG. 1 shows, viewed from above, a reaper-thresher machine comprising a feeding mechanism in accordance with the invention.

In a relatively simplified view and as an example of the application, FIG. 1 represents an agricultural machine 1, such as a reaper-thresher machine or an ensiling machine, comprising a feeding mechanism 2.

The reaper-thresher machine 1 is more particularly suited for cutting and threshing plants comprising a stem standing in a substantially vertical position, such as wheat, barley, rye or oats, etc. This machine is capable of moving along a direction of propagation 3, for example on wheels 4 controlled by a motor contained in the bodywork 6. The reaper machine 1 comprises means enabling the plants to be removed from the ground in which they are planted, whether such means are stem cutting means 7 as illustrated, or any other means, for example for collecting already cut stems. Said means are such that they operate along a line 8 which makes a given angle with the direction of propagation 3, for example perpendicular to said direction.

Means 7 as illustrated are composed of fingers 9 defining guide and holding spaces 10 associated with a toothed cutting blade 11 which can be moved by alternating oscillation movements to pass alternately into the spaces 10 and cut the stems which are trapped therein. Of course, these components are given only as an example of an embodiment of means enabling the plants to be removed from the ground in which they have grown.

The reaper machine also comprises means 12 for collecting the stems cut by said blade along line 8 and for moving them along a flux 13 having a direction 14 which makes a given angle with the direction of propagation 3, with said angle generally being the same as that which the cutting line 8 makes with the direction of propagation 3. Said means 12 enable the cut stems to be brought to an opening 15 for treatment which is generally that of a conveyer 16 which takes the cut plants towards a place for treatment, for example the thresher machine.

These means 12 are generally composed of an endless screw 17 comprising, on its periphery, walls 18 forming a spiral for channeling the flux 13 of cut plants and pushing it towards the opening 15. In the example shown, the opening of the conveyer is situated in the middle of the cutting line and, in such case, the machine comprises two endless screws situated on either side of said opening 15 and with reversed threads. In front of the opening 15, the screw 17 contains retractable lugs 19 enabling the flux to be pushed into the opening 15 and the conveyer 16. Since these lugs are known, they will not be more fully described herein.

The feeding mechanism 2 is mounted in cooperation with the cutting means such that it is substantially in the axis of the opening 15 taken along the direction of propagation 3 of the machine.

It comprises a first part composed of means 21 to laterally displace an assembly of stems located in the axis of the opening 15, with said axis being generally arranged along the direction of propagation 3 of the machine. Said means are composed of a wall 22 which is defined substantially in a plane in which the stems of the plants to be cut are generally situated, that is, in fact, a vertical plane in relation to the ground, with said plane making an acute angle 23 in relation to the direction of propagation 3.

After these first means 21, the feeding mechanism comprises means 24 to incline the stems which have been displaced towards and in the direction of the movement of the flux 13 and in order to send them onto said flux before its entry into opening 15. Preferably, the stems of the assembly are cut by the cutting means 7 at the same time as they are inclined. In a preferred embodiment, said stem inclining means are composed of a wall 25 extending from wall 22 but becoming progressively sloped in relation to the plane of said wall while continuing to become separated from the axis of the direction of propagation 3.

The feeding mechanism then comprises means 26 for guiding the flux completed by the assembly of displaced, inclined and cut stems towards the opening 15. Said means are composed of a guiding wall 27 starting from the point of the surface 25 enabling the farthest slope from the direction 3 and ending towards the opening substantially on the axis passing through the top 28 of surface 22 and parallel to direction 3. With the endless screw, this guiding wall forms a funnel 29 for guiding the flux 13 towards the opening 15. By giving this surface a rounded convex shape 30, it preferably comprises means for compression of the flux 13 of cut plants prior to entry into the opening 15, in order to reduce its transversal volume and, therefore, facilitate its entry into said opening.

Figure 6:
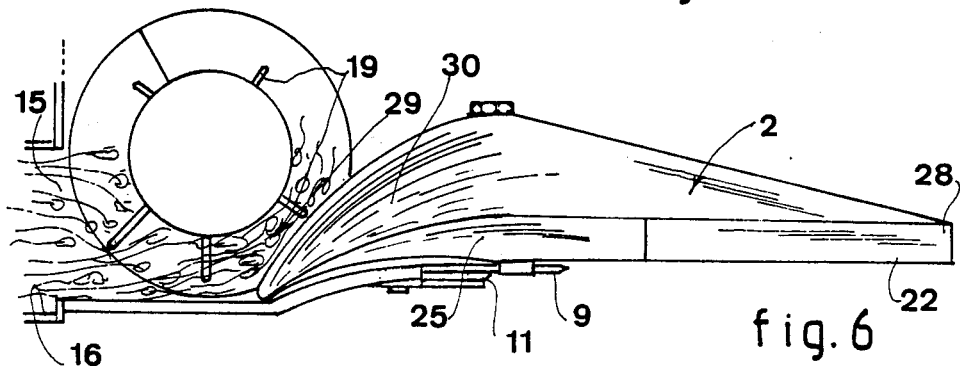
FIGS. 5 and 6 are views enabling an explanation of the operation and the advantages of the gear mechanism of FIGS. 1 to 4.
Figure 2:
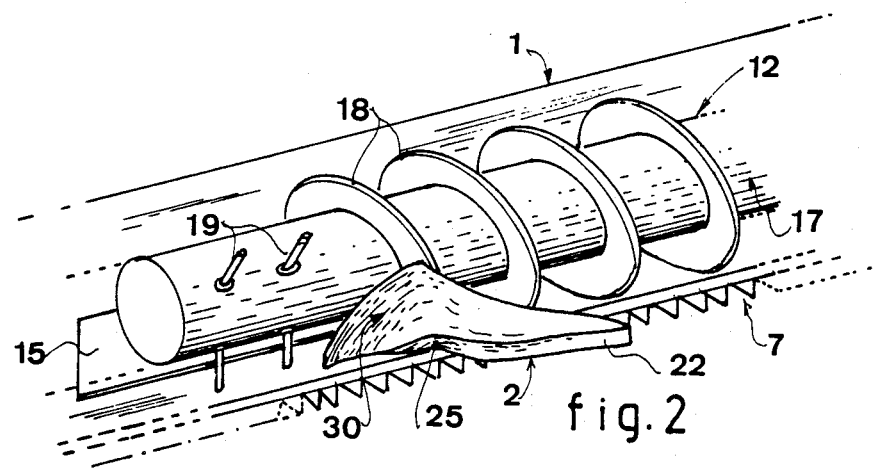
FIGS. 2 to 4 show different perspective views of one embodiment of a feeding mechanism in accordance with the invention.
Figure 3:
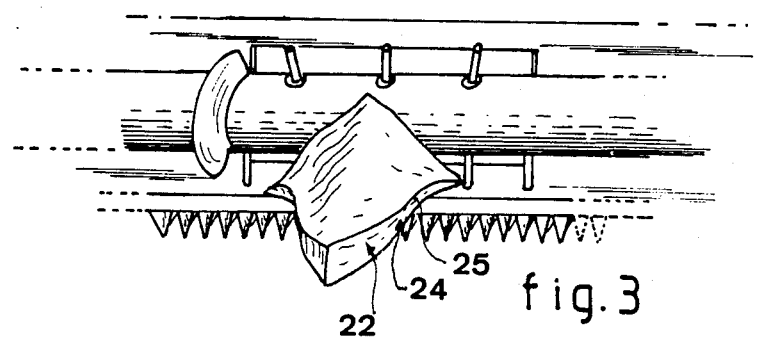
Figure 4:
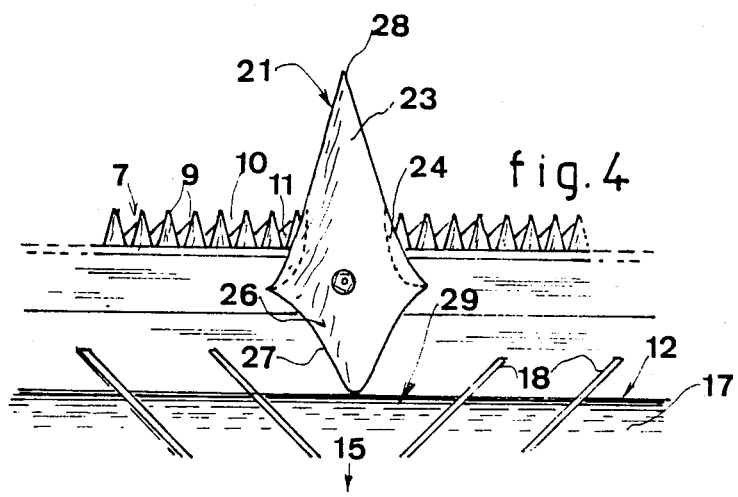
Figure 5:
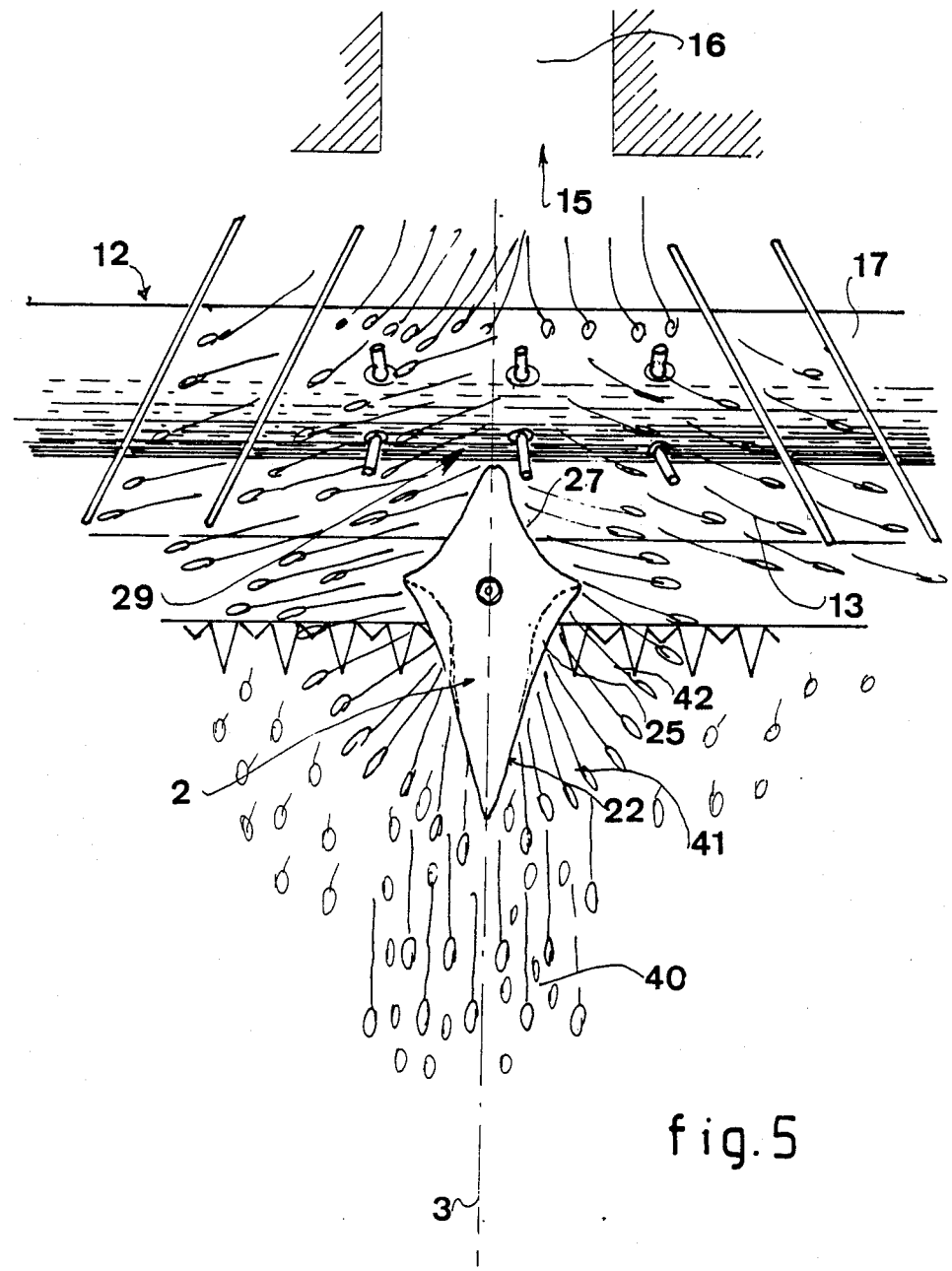

The feeding mechanism 2 in cooperation with machine 1 operates in the following manner, it being noted that such operation is described more particularly in reference to FIGS. 5 and 6:

The assembly of plants 40 which are substantially in the axis of the opening 15 is first deviated at 41 by the deflecting part 21, then inclined at 42 to be sent in superposition onto the flux 13 of cut plants which arrive pushed by the endless screw 17. Of course, the inclined plants at 42 are also cut with great regularity at the same time as those which come from the cutting means supply screw. By means of its rear part composed by the deflector-compressor 26, the flux, together with the assembly of stems which were deviated and inclined, is introduced into the opening 15 by being at least partially compressed by the action of the retractable lugs 19, with said introduction taking place without jerking since the both parts of cereals are relatively compressed and therefore occupy less volume than if they arrived, as in the prior art, directly opposite opening 15.

In the example given above with regard to FIGS. 1 to 6, the gear mechanism shown is formed of two feeding mechanism parts which are coupled in a symmetrical manner in relation to a plane. It is, however, very obvious that such a feeding mechanism can comprise only one of the two parts shown in FIGS. 1 to 6.

Figure 7:
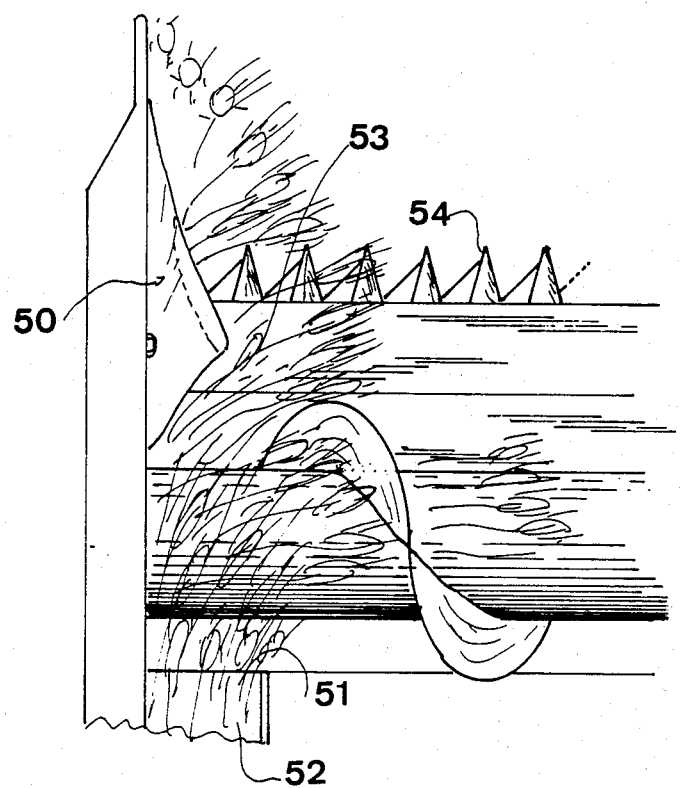
FIG. 7 shows another embodiment of a feeding mechanism in accordance with the invention.

By way of example, FIG. 7 shows an embodiment of a feeding mechanism 50 which is capable of cooperating with one entry 51 of a conveyer 52 which is located at one end 53 of a cutting line 54. This feeding mechanism 50 operates in the same manner as the one described above.

The gear mechanism can be obtained by molding or any other technique in materials such as smooth polyester glass fiber or even metal.

I claim:

1. A feeding mechanism adapted to be connected to a cutter bar support of a reaper which is capable of moving along a direction of propagation and of cutting plants which have substantially vertical stems and which includes means for cutting said stems along a line making a given angle with said direction of propagation to form cut stems and means for collecting the cut stems, moving said cut stems in a flux making a given angle with said direction of propagation and bringing them to an opening in the reaper for treatment, said feeding mechanism comprising:

displacing means for laterally displacing an assembly of stems engageable by said mechanism.

inclining means for inclining the displaced stems of said assembly of stems along a direction substantially in the direction of movement of said flux and in order to send said stems onto said flux before its entry into said opening, guiding means for guiding said flux completed by said assembly of stems towards said opening, and compressing means for compressing the flux of the plants before said flux enters into said opening;

wherein said feeding mechanism has a longitudinal axis adapted to extend parallel to said direction of propagation, said displacing means of said feeding mechanism is comprised of a first wall lying substantially in a plane in which the stems of the plants to be cut are substantially arranged with said plane making an acute angle relative to said longitudinal axis, said stem inclining means of said feeding mechanism is comprised of a second wall extending from said first wall with said second wall becoming progressively inclined in relation to said plane of said first wall by diverging from the axis of said feeding mechanism and said guiding means of said feeding mechanism is comprised of a third wall starting from the point of said second wall which is the farthest from the axis of said feeding mechanism and ending adjacent the opening substantially on said axis of said feeding mechanism.

2. A feeding mechanism as set forth in claim 1, wherein said third wall is provided with a convex surface adapted to form a funnel with the means for cutting and moving said flux.

* * * * *